United States Patent
Lion et al.

(10) Patent No.: US 9,220,280 B2
(45) Date of Patent: Dec. 29, 2015

(54) PASTRY CUTTER

(71) Applicants: Mathieu Lion, Paris (FR); Marie Buet, Paris (FR)

(72) Inventors: Mathieu Lion, Paris (FR); Marie Buet, Paris (FR)

(73) Assignee: MASTRAD, S.A., Paris (FR)

( * ) Notice: Subject to any disclaimer, the term of this patent is extended or adjusted under 35 U.S.C. 154(b) by 1 day.

(21) Appl. No.: 13/759,878

(22) Filed: Feb. 5, 2013

(65) Prior Publication Data

US 2014/0220169 A1 Aug. 7, 2014

(51) Int. Cl.
*A21C 11/10* (2006.01)
*A21C 11/04* (2006.01)

(52) U.S. Cl.
CPC .............. *A21C 11/106* (2013.01); *A21C 11/04* (2013.01)

(58) Field of Classification Search
CPC .................................................... A21C 11/106
USPC ......... 425/292, 298, 299, 236, 183, 184, 185, 425/193, 194, 276, 281, 282, 283, 286, 3, 425/DIG. 33
See application file for complete search history.

(56) References Cited

U.S. PATENT DOCUMENTS

| 2,779,097 | A | * | 1/1957 | Frazier | 30/130 |
| 2,799,929 | A | * | 7/1957 | Kurianski | 30/301 |
| 3,053,203 | A | * | 9/1962 | Gaddini | 425/299 |
| 3,270,692 | A | * | 9/1966 | Cummins, Sr. | 425/298 |
| 6,990,892 | B2 | * | 1/2006 | Errera | 99/388 |
| 7,331,776 | B2 | * | 2/2008 | Errera | 425/298 |
| 8,230,604 | B1 | * | 7/2012 | Corey et al. | 30/358 |
| 2004/0040443 | A1 | * | 3/2004 | Errera | 99/388 |
| 2004/0040446 | A1 | * | 3/2004 | Errera | 99/388 |
| 2005/0150394 | A1 | * | 7/2005 | Errera | 99/388 |
| 2006/0225579 | A1 | * | 10/2006 | Errera | 99/388 |
| 2011/0283548 | A1 | * | 11/2011 | White | 30/301 |

* cited by examiner

*Primary Examiner* — Seyed Masoud Malekzadeh
(74) *Attorney, Agent, or Firm* — Novak Druce Connolly Bove + Quigg LLP

(57) ABSTRACT

An apparatus for cutting and de-molding a dough sheet is described. The apparatus comprises a hollow cutter body, a cutting edge about an opening in the hollow cutter body, a compressible extractor in the hollow cuter body, an ejector, and a stamp with a pattern. The compressible extractor may be actuated between a first and second state. The hollow cutter body is magnetically engaged with the compressible extractor and the compressible extractor is magnetically engaged with the stamp.

5 Claims, 6 Drawing Sheets

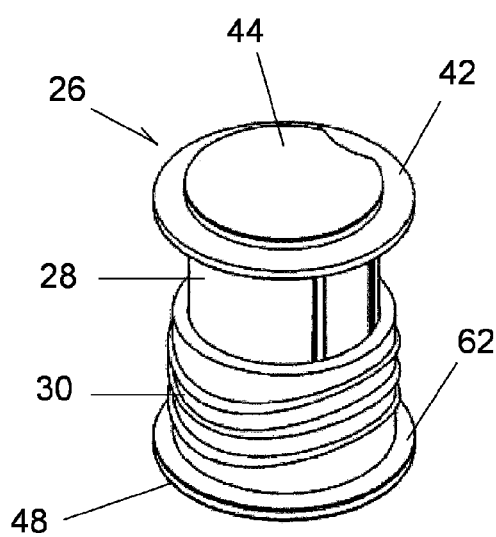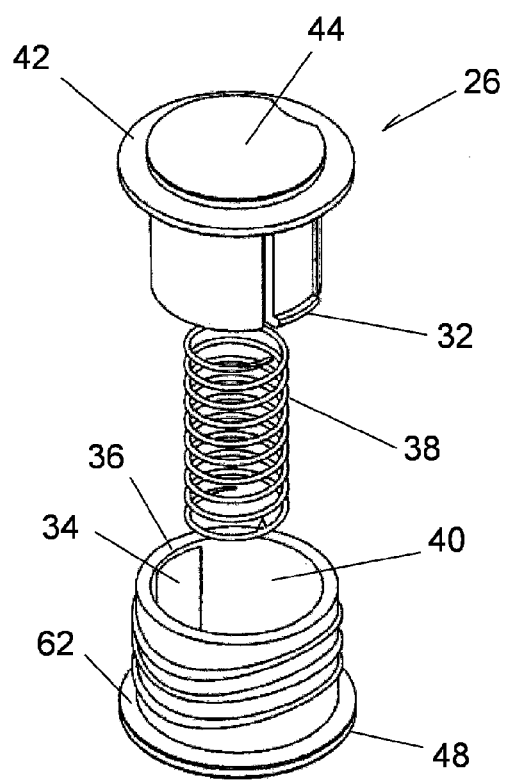
*Figure 3A*          *Figure 3B*

PASTRY CUTTER

BACKGROUND OF THE INVENTION

The field of the present invention is an apparatus for cutting sheets of dough and other pliable food materials.

Pastry cutters include variously shaped cutters which are of a rigid metal or plastic material with a cutting edge defining a hollow shape. Such cutters are typically used for cutting shapes from sheets of dough and other pliable food materials. The present disclosure refers to dough; but this term is employed here to specifically include other pliable food materials such as slices of bread. One challenge in working with and cutting pliable sheets of dough is the inherent tendency for the dough to stick. Once a desired shape is cut, it is often difficult to remove the shaped cutter without deforming the desired shape of the cut dough.

Cookie items particularly come with a broad assortment of different shapes and embellishments. Numerous different cutters and tools employed to create such a variety can be difficult to accommodate in an already crowded kitchen.

What is therefore desired is a device which easily permits concurrent cutting and embellishment of dough and facile separation of the processed dough from the device.

SUMMARY OF THE INVENTION

The present invention is directed to a pastry cutter principally for the preparation of individual pastries and other food items from a pliable sheet such as dough.

In a first aspect of the present invention, a pastry cutter includes a cutter body having an open cavity with the cutting edge about the opening. A compressible extractor is positioned in the cavity of the cutter body and is spring biased toward the plane of the cutting edge. An extraction surface associated with an ejector element on the outward end of the compressible extractor extends outwardly to the cutting edge. A stamp extends outwardly from the ejector. With this apparatus, dough is released from the cutting edge.

In a second aspect of the present invention, the pastry cutter includes a cutter body with a compressible extractor in the cavity of the cutter body, an ejector with an extraction surface to separate the dough from the cutting edge and a stamp extending outwardly from the ejector. The components are removably fixable by magnetic engagements.

Accordingly, it is an object of the present invention to provide an improved pastry cutter. Other and further objects and advantages will appear hereinafter.

BRIEF DESCRIPTION OF THE DRAWINGS

FIGS. 3A and 3B are perspective and exploded assembly perspective views, respectively, of a compressible extractor.

Like numerals refer to like parts throughout the several views of the pastry cutter.

DETAILED DESCRIPTION OF THE PREFERRED EMBODIMENT

Figure 1A:
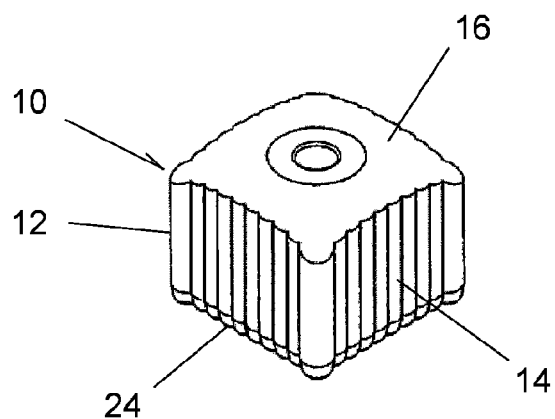
FIGS. 1A, 1B and 1C are perspective, top and bottom views, respectively, of a pastry cutter.
Figure 1B:
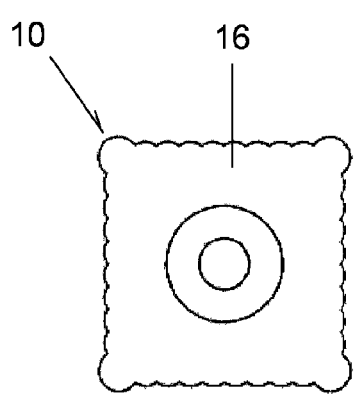
Figure 1C:
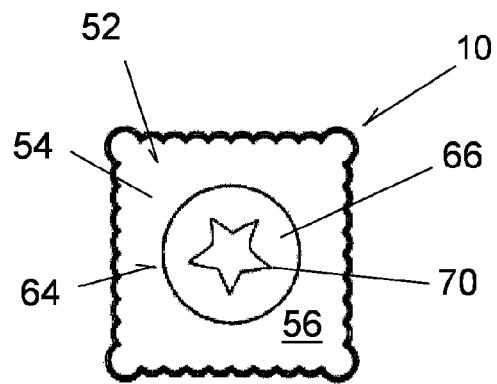
Figure 2:
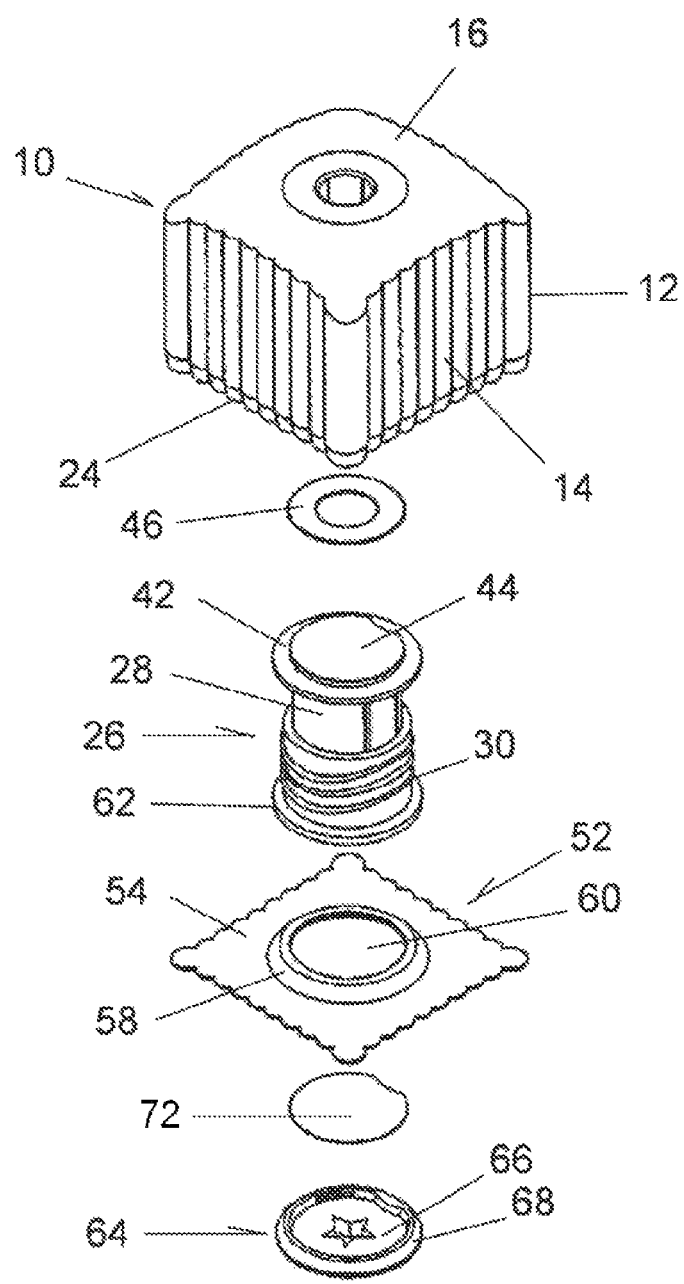
FIG. 2 is an exploded assembly perspective view of the pastry cutter of FIGS. 1A, 1B and 1C.

FIGS. 1A, 1B and 1C illustrate the full assembly of a pastry cutter 10. The cutter 10 is able to cut shapes from a sheet of dough, mold one surface of the sheet and separate the dough from the cutter 10 when the cutter is removed. The cutter 10 includes a cutter body 12 having sides 14 and a top 16 defining an open cavity 18. The cavity 18 includes a bottom 20 which is on the underside of the top 16 and an opening 22 at the opposite end of the cutter body 12 from the bottom 20 of the cavity 18. The opening 22 is surrounded by a cutting edge 24 defining the shape of the final pastry to be cut. Looking at the cutter body 12 alone, there is no mechanism for separating the shaped piece of dough as the cutter is withdrawn from the dough.

A compressible extractor 26 is arranged within the cavity 18. The extractor 26 may be generally cylindrical in shape with a wide variety of cross sections possible including circular and square. A generally right circular cylinder is presented in the preferred embodiment. The extractor 26 includes a first body portion 28 and a second body portion 30. The two body portions 28, 30 are telescoped together to form a hollow housing. The second body portion 30 is shown to receive outwardly extending flanges 32 on the first body portion 28. The outwardly extending flanges 32 are found on two sides of the first body portion 28 to fit within grooves 34 on the interior of the second body portion 30. The grooves 34 do not extend all the way to the opening of the second body portion 30 so that engaging inwardly extending flanges 36 are formed. The outwardly extending flanges 32 are beveled to assist in assembly with the second body portion 30. A coil spring 38 is positioned within the interior 40 of the compressible extractor 26 with some precompression. The ends of the compressible extractor 26 may be made identical such that it can be placed in the assembly of the cutter 10 with either end up.

The first end 42 of the compressible extractor 26 includes a magnet 44. The magnet 44 creates an engagement with the bottom 20 of the cavity 18. If the compressible extractor 26 is principally of non ferromagnetic material, a washer 46 of ferromagnetic material may be affixed to the cutter body 12 in the top 16 by conventional means such as adhesives or molding in situ. In this way, a magnetic engagement with the top 16 of the cutter body 12 is created. The magnet 44 and ferromagnetic element 46 may be interchanged to create the magnetic engagement. Of course, it is also possible to permanently affix the first end 42 of the compressible extractor 26 against the bottom 20 of the cutter body 12 if disassembly is not of interest.

A second end 48 of the compressible extractor 26 is movable relative to the first end 42 through compression of the coil spring 38. This second end 48 also includes a magnet 50. The coil spring 38 biases this second end 48 toward full extension where the flanges 32 and 36 engage. With precompression of the coil spring 38 even with the compressible extractor 26 at full extension, the coil spring 38 exerts a force on the sheet of dough before compression of the compressible extractor 26.

An ejector 52 is associated with the second end 48 of the compressible extractor 26. In the preferred embodiment, the ejector 52 is a plate 54 which extends outwardly to the cutting edge 24. The plate 54 includes an extraction surface 56 to push dough from the cutter body 12 as the pastry cutter 10 is withdrawn. A beveled ring 58 in the plate 54 is located about a hole 60 centrally located in the ejector 52. The beveled ring 58 is received about the second body portion 30 of the compressible extractor 26 to abut against a peripheral flange 62. The extraction surface 56 extends from the cavity to at least the full extent of the cutting edge 24 when the compressible extractor 26 is fully released.

Figure 4A:
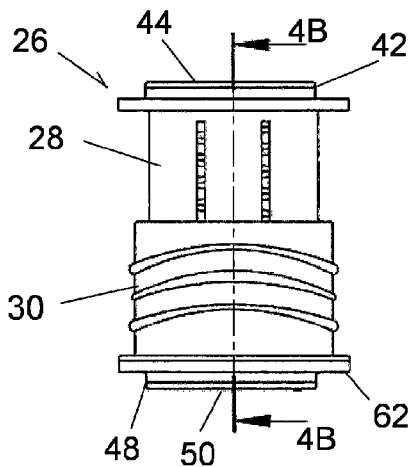
FIGS. 4A and 4B are side and cross-sectional views, respectively, of the compressible extractor in an expanded state.
Figure 4B:
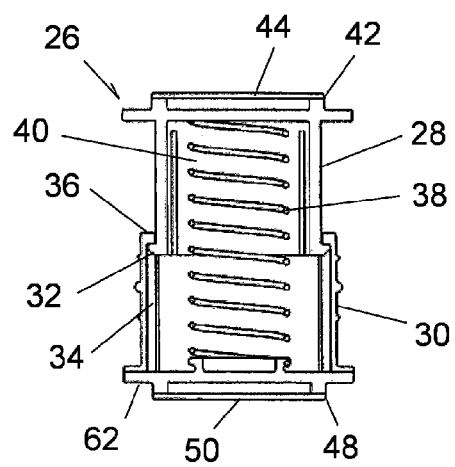
Figure 5A:
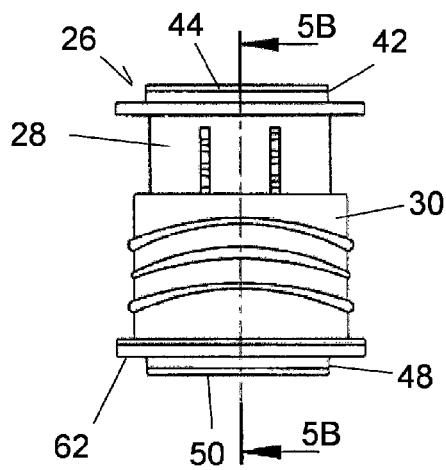
FIGS. 5A and 5B are side and cross-sectional views, respectively, of the compressible extractor in a contracted state.
Figure 5B:
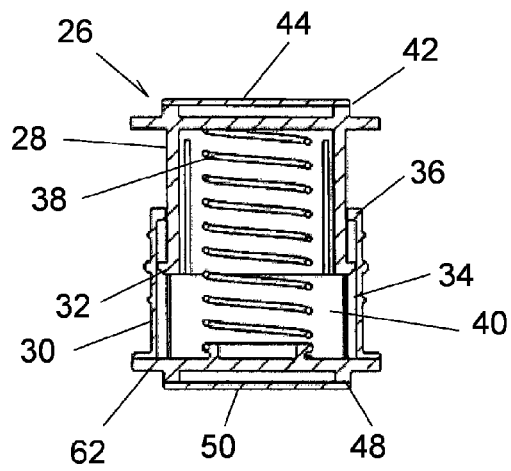
Figure 6A:
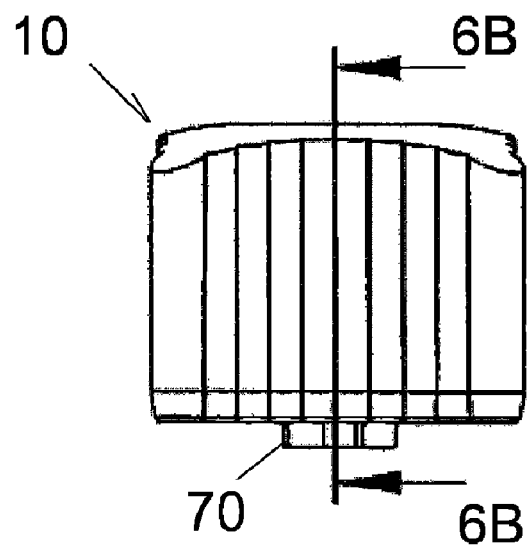
FIGS. 6A and 6B are side and cross-sectional views, respectively, of the pastry cutter of FIGS. 1A, 1B and 1C in an expanded state.
Figure 6B:
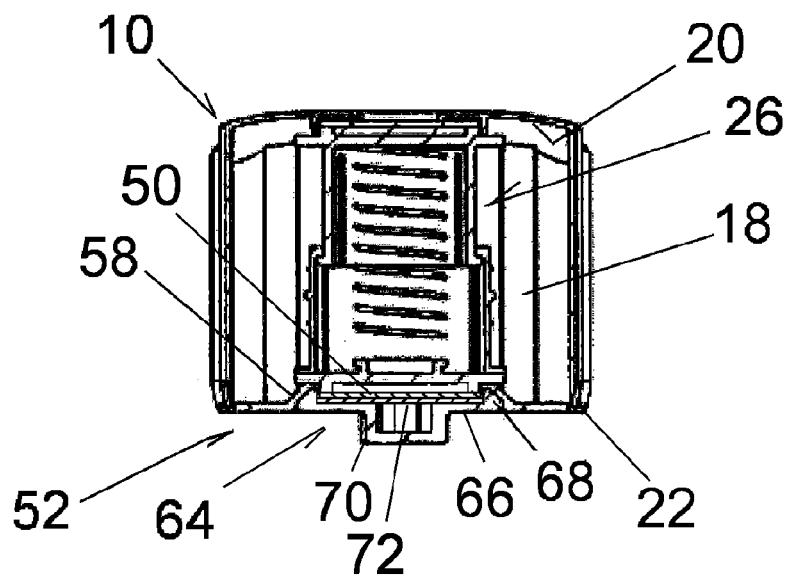
Figure 7A:
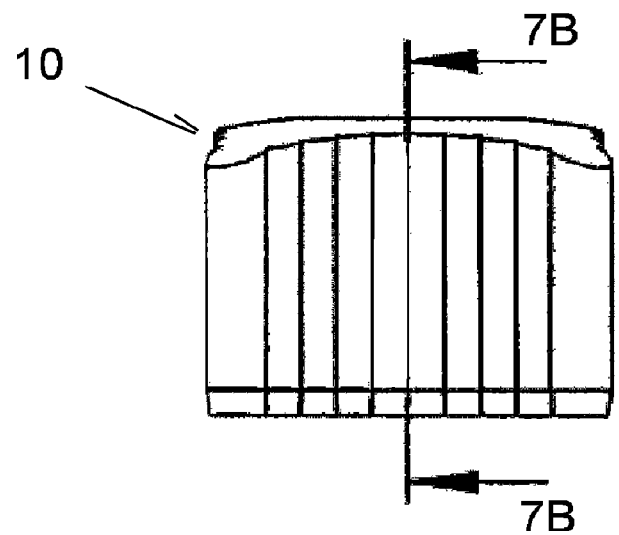
FIGS. 7A and 7B are side and cross-sectional views, respectively, of the pastry cutter of FIGS. 1A, 1B and 1C in a contracted state.
Figure 7B:
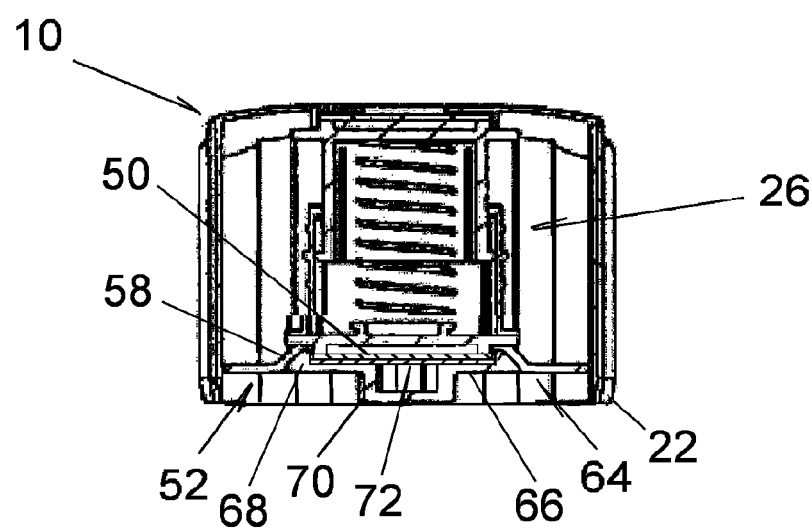

A stamp 64 having a base 66 is located at the beveled ring 58 on the extraction surface 56. The stamp 64 is of non ferromagnetic material in the preferred embodiment but may be ferromagnetic. To create a magnetic engagement with the magnet 50 on the end of the compressible extractor 26, a disc 72 of ferromagnetic material is affixed to the stamp 64 to become a part thereof. As before, the magnet 50 and the ferromagnetic material of the stamp 64 or the disc 72 may be interchanged to create the magnetic engagement; and it is also possible to permanently affix the second end 48 of the compressible extractor 26 with the stamp 64 if disassembly is not of interest. The stamp 64 also has a ring 68 on the side of the stamp 64 facing the extraction surface 56. This ring 68 has a cross section which closely fits into the space radially inwardly of the beveled ring 58 and outwardly of the second body portion 30. As the ejector 52 has a hole 60 surrounded by a bevel 58, the edge of the hole sits against the flange 62 around the magnet 50 shown in FIGS. 4 and 5. The stamp 64 and disc 72 are integrated and fit into the bevel 58. The disc 72 is ferromagnetic material to hold the stamp 64 and capture the ejector 52 through a magnetic engagement with the magnet 50.

The other side of the ejector 52 may take on a virtually infinite variety of designs and shapes. Illustrated in the preferred embodiment is a star die 70. A distinct design from the die 70 which may be employed is a dome for forming a cavity centered in the dough to receive preserves or other fillings such as chocolate, butter nuts, etc. Lastly, a flat surface level with the extraction surface 56 outwardly of the beveled ring 58 may be employed to leave a flat surface on the dough.

In operation, the pastry cutter 10 is assembled with the cutter body 12, the compressible extractor 26, the ejector 52 and the stamp 64 arranged in series and magnetically engaged. The advantage of this configuration is that it permits the interchangeability of a plurality of cutting edges 24, ejectors 52 and stamps 64 having different shapes and sizes onto the same compressible extractor 26. This permits a wide variety and diversity of shapes, sizes and imprints for the dough sheet upon which the pastry cutter 10 is configured to cut and mold.

With the components assembled, the pastry cutter 10 is brought down on a sheet of dough with sufficient force for the cutting edge 24 to separate the dough in the shape defined by the sides 14 of the cutter body. With preload in the coil spring 38, the die 70 penetrates the dough. When the extraction surface 56 encounters the dough, the compressible extractor 26 moves into the open cavity 18 of the cutter body 12. As the cutter 10 is withdrawn, the compressible extractor 26 extends the ejector 52 to the cutting edge 24, wiping the dough from the cutter body 12 and exposing it for release from the cutter 10. The formed dough is then accessible to be removed from the cutter 10. Coatings such as nonstick surfaces have not been found to be necessary but may be employed if desired.

Looking at the operation of the mechanism, the coil compression spring 38 only moves a small percentage of its overall length. Consequently, the spring constant is not critical. Of greater importance is the precompression load on the spring 38 which resists compression of the extractor 26. As the cutter 10 is pressed down on a sheet of dough, the cutting edge 24 will define the perimeter of the pastry. The ejector 52 will resist movement as the die 70 is forced into the dough because of the precompression load on the spring 38 but be forced upwardly into the cavity 18 against the spring 38 when the larger surface area of the extraction surface 56 encounters the dough and the dough provides a much greater resistance force. This allows the design of the die 70 to be stamped into the dough surface while the remaining surface of the dough is undisturbed. As the pastry cutter 10 is removed, the compression force against the extractor 26 is removed and the extraction surface 56 can eject the dough from the cavity 18 of the cutter body 18.

Thus, an improved pastry cutter is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A pastry cutter comprising
a cutter body including a cavity having an opening with a cutting edge about the opening and a bottom of the cavity;
a compressible extractor including a telescoping housing having first and second body portions with engagement therebetween to limit an extension of the telescoping housing, a first end on the first body portion fixable to the bottom of the cavity and a second end on the second body portion movable relative to the first end, and a compression spring in the telescoping housing biasing the first and second ends apart;
an ejector fixable to the second end of the compressible extractor including an extraction surface extending to the cutting edge about the opening, the extraction surface extending from the cavity to at least the cutting edge with the compressible extractor fully released wherein the telescoping housing is removably fixable to the bottom of the cavity and the ejector, respectively;
a stamp on the ejector at the extraction surface magnetic engagements between the bottom of the cavity and the first end of the compressible extractor and between the second end of the compressible extractor and the ejector.

2. The pastry cutter of claim 1, the engagement of the telescoping housing retaining the compression spring in precompression.

3. The pastry cutter of claim 1, the second end of the compressible extractor being removably engagable with the stamp.

4. A pastry cutter comprising
a cutter body including a cavity having an opening with a cutting edge about the opening and a bottom of the cavity;
a compressible extractor including a telescoping housing having first and second body portions with engagement therebetween to limit an extension of the telescoping housing, a first end on the first body portion fixable to the bottom of the cavity and a second end on the second body portion movable relative to the first end, and a compression spring in the telescoping housing biasing the first and second ends apart, wherein the engagement of the telescoping housing retains the compression spring in precompression;
an ejector removably fixable to the second end of the compressible extractor including an extraction surface extending to the cutting edge about the opening, the extraction surface extending from the cavity to at least the extent of the cutting edge with the compressible extractor fully released wherein the telescoping housing is removably fixable to the bottom of the cavity and the ejector, respectively;

a stamp at the extraction surface extending outwardly therefrom;

magnetic engagements between the bottom of the cavity and the first end of the compressible extractor and between the second end of the compressible extractor and the ejector.

5. The pastry cutter of claim 4, the second end of the compressible extractor being removably engagable with the stamp.

* * * * *